US012632375B2

(12) United States Patent
Bert

(10) Patent No.: US 12,632,375 B2
(45) Date of Patent: May 19, 2026

(54) CONFIGURATION OF MEMORY SERVICES OF A DATA STORAGE DEVICE TO A HOST SYSTEM

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 18/503,481

(22) Filed: Nov. 7, 2023

(65) Prior Publication Data

US 2024/0176735 A1 May 30, 2024

Related U.S. Application Data

(60) Provisional application No. 63/385,095, filed on Nov. 28, 2022.

(51) Int. Cl.
*G06F 12/02* (2006.01)
*G06F 12/0815* (2016.01)

(52) U.S. Cl.
CPC ...... *G06F 12/0246* (2013.01); *G06F 12/0815* (2013.01)

(58) Field of Classification Search
CPC .... G06F 3/0601; G06F 3/0604; G06F 3/0605; G06F 3/0631; G06F 3/0655; G06F 3/0661; G06F 3/0679; G06F 12/0246; G06F 12/0815
See application file for complete search history.

(56) References Cited

U.S. PATENT DOCUMENTS

| | | | |
|---|---|---|---|
| 2020/0371700 A1* | 11/2020 | Stabrawa | G06F 3/0631 |
| 2022/0100669 A1* | 3/2022 | Choe | G06F 12/0877 |
| 2022/0197819 A1* | 6/2022 | Kumar | G06F 12/109 |
| 2022/0253227 A1* | 8/2022 | Helmick | G06F 3/0604 |
| 2022/0358042 A1* | 11/2022 | Malladi | G06F 12/0828 |
| 2023/0062610 A1* | 3/2023 | Gim | G06F 13/1668 |
| 2023/0289074 A1* | 9/2023 | Choi | G06F 9/5016 |
| 2023/0350832 A1* | 11/2023 | Lee | G06F 13/4221 |
| 2023/0359578 A1* | 11/2023 | Lee | G06F 12/0238 |
| 2024/0086076 A1* | 3/2024 | Jun | G06F 3/0673 |
| 2024/0095171 A1* | 3/2024 | Garg | G06F 13/28 |

* cited by examiner

*Primary Examiner* — Tracy A Warren
(74) *Attorney, Agent, or Firm* — Greenberg Traurig

(57) ABSTRACT

A host system connected to a memory sub-system via a connection to configure memory services provided by the memory sub-system to the host system over the connection. The memory sub-system can allocate a portion of its memory resources to provide storage services to the host system, and allocate another portion of its memory resources to provide memory services to the host system. In response to a request from the host system over the connection, the memory sub-system can update configuration data of the memory services and provide the memory services according to the parameters specified by the request. The request can be implemented in the protocol over the connection for storage access, or in the protocol over the connection for memory access. The request can be implemented via a store instruction, a write command, or another command having another command identifier.

18 Claims, 10 Drawing Sheets

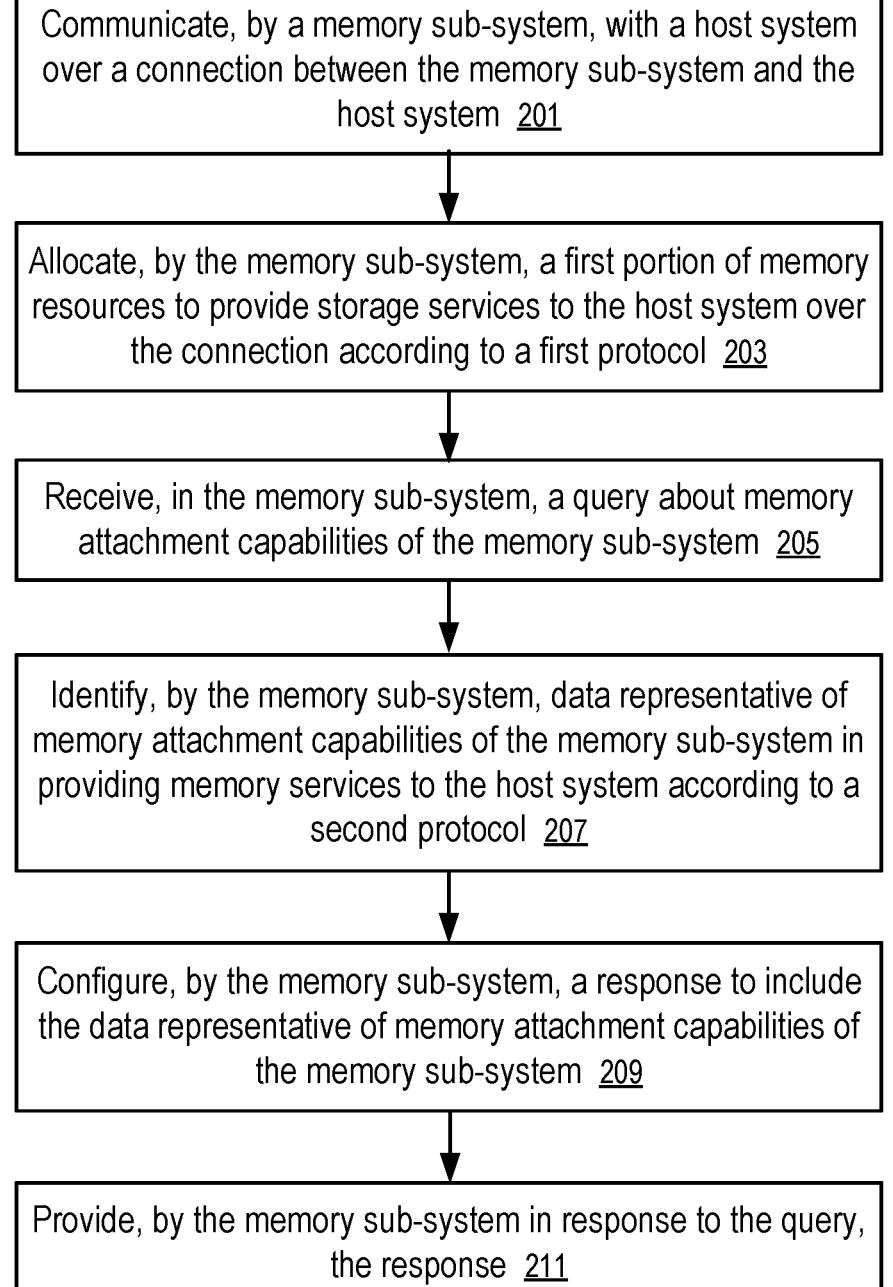

Communicate, by a memory sub-system, with a host system over a connection between the memory sub-system and the host system  201

Allocate, by the memory sub-system, a first portion of memory resources to provide storage services to the host system over the connection according to a first protocol  203

Receive, in the memory sub-system, a query about memory attachment capabilities of the memory sub-system  205

Identify, by the memory sub-system, data representative of memory attachment capabilities of the memory sub-system in providing memory services to the host system according to a second protocol  207

Configure, by the memory sub-system, a response to include the data representative of memory attachment capabilities of the memory sub-system  209

Provide, by the memory sub-system in response to the query, the response  211

FIG. 6

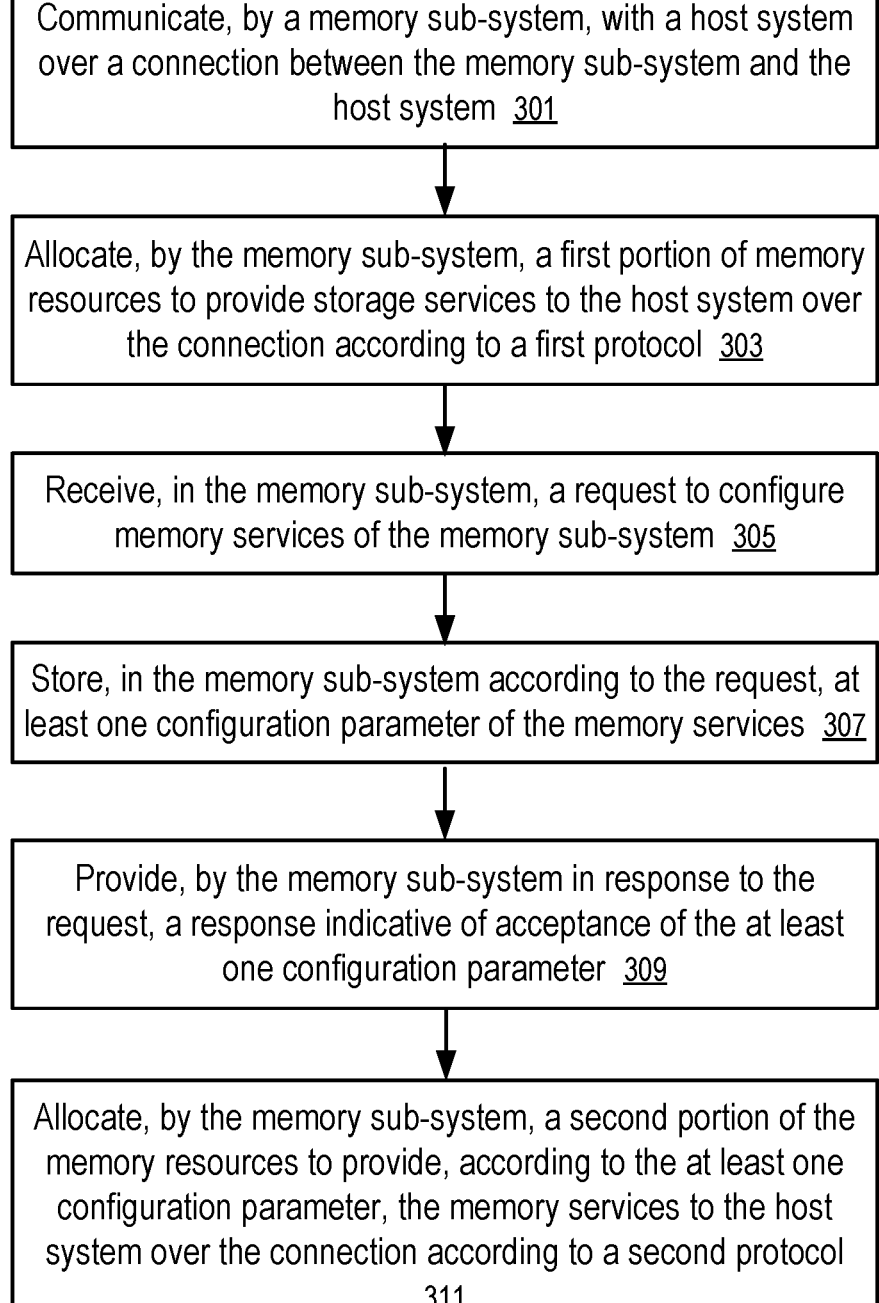

Communicate, by a memory sub-system, with a host system over a connection between the memory sub-system and the host system 301

Allocate, by the memory sub-system, a first portion of memory resources to provide storage services to the host system over the connection according to a first protocol 303

Receive, in the memory sub-system, a request to configure memory services of the memory sub-system 305

Store, in the memory sub-system according to the request, at least one configuration parameter of the memory services 307

Provide, by the memory sub-system in response to the request, a response indicative of acceptance of the at least one configuration parameter 309

Allocate, by the memory sub-system, a second portion of the memory resources to provide, according to the at least one configuration parameter, the memory services to the host system over the connection according to a second protocol 311

FIG. 10

CONFIGURATION OF MEMORY SERVICES OF A DATA STORAGE DEVICE TO A HOST SYSTEM

RELATED APPLICATIONS

The present application claims priority to Prov. U.S. Pat. App. Ser. No. 63/385,095 filed Nov. 28, 2022, the entire disclosures of which application are hereby incorporated herein by reference.

TECHNICAL FIELD

At least some embodiments disclosed herein relate to memory systems in general, and more particularly, but not limited to memory systems configured to be accessible for memory services and storage services.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 6 shows a method to identify memory capability of a data storage device capable of providing memory services to a host system according to one embodiment.

FIG. 10 shows a method to configure memory services of a data storage device over a connection to a host system according to one embodiment.

DETAILED DESCRIPTION

Figure 1:
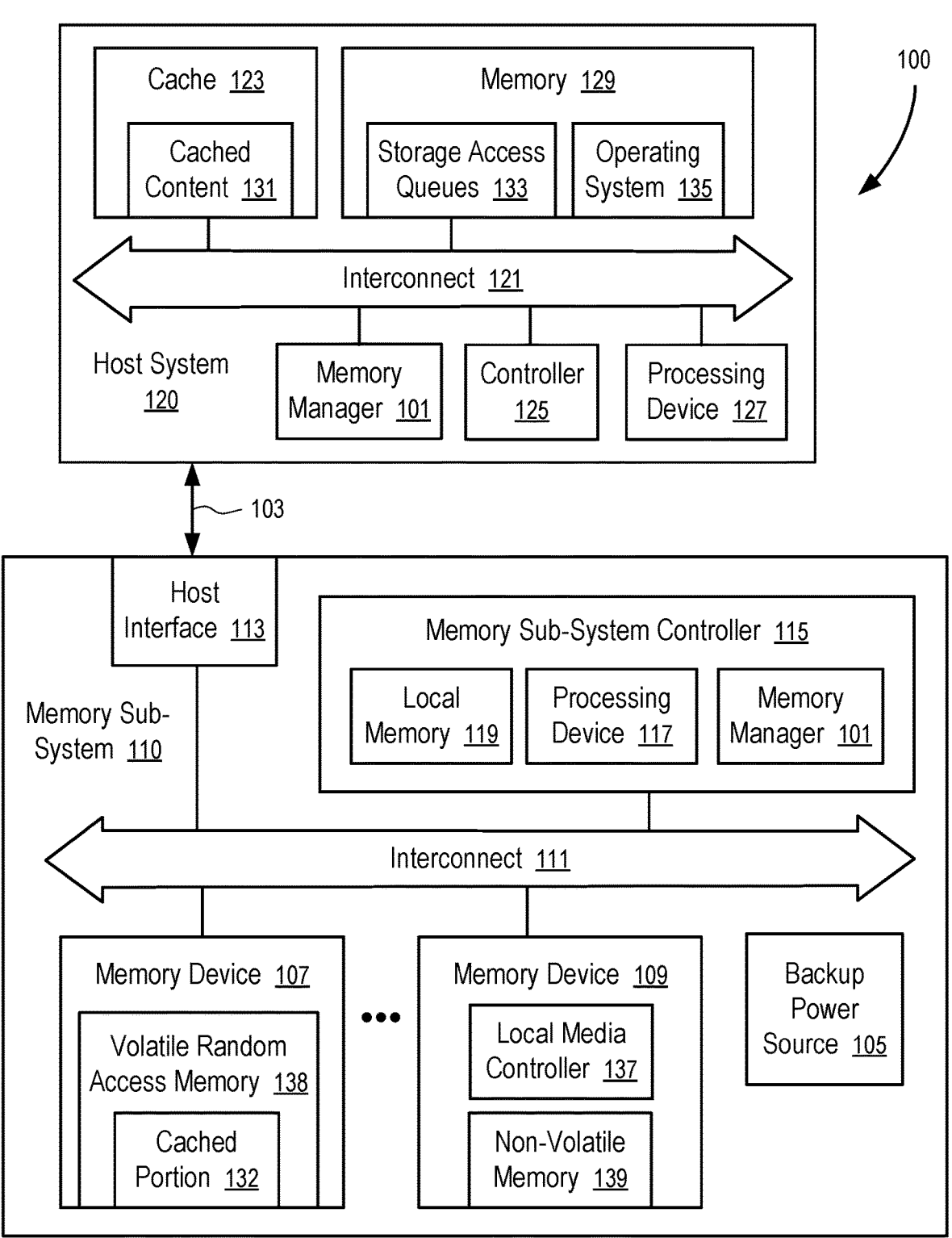
FIG. 1 illustrates an example computing system having a memory sub-system in accordance with some embodiments of the present disclosure.

At least some aspects of the present disclosure are directed to a memory sub-system configured with a host interface operable to provide both memory services and storage services to a host system over a physical connection.

For example, a host system and a memory sub-system (e.g., a solid state drive (SSD)) can be connected via a physical connection according to a computer component interconnect standard of compute express link (CXL). Compute express link (CXL) includes protocols for storage access (e.g., cxl.io), and protocols for cache-coherent memory access (e.g., cxl.mem and cxl.cache). Thus, a memory sub-system can be configured to provide both storage services and memory services to the host system over the physical connection using compute express link (CXL).

A typical solid-state drive (SSD) is configured or designed as a non-volatile storage device that preserves the entire set of data received from a host system in an event of unexpected power failure. The solid-state drive can have volatile memory (e.g., SRAM or DRAM) used as a buffer in processing storage access messages received from a host system (e.g., read commands, write commands). To prevent data loss in a power failure event, the solid-state drive is typically configured with an internal backup power source such that, in the event of power failure, the solid-state drive can continue operations for a limited period of time to save the data, buffered in the volatile memory (e.g., SRAM or DRAM), into non-volatile memory (e.g., NAND). When the limited period of time is sufficient to guarantee the preservation of the data in the volatile memory (e.g., SRAM or DRAM) during a power failure event, the volatile memory as backed by the backup power source can be considered non-volatile from the point of view of the host system. Typical implementations of the backup power source (e.g., capacitors, battery packs) limit the amount of volatile memory (e.g., SRAM or DRAM) configured in the solid-state drive to preserve the non-volatile characteristics of the solid-state drive as a data storage device. When functions of such volatile memory are implemented via fast non-volatile memory, the backup power source can be eliminated from the solid-state drive.

When a solid-state drive is configured with a host interface that supports the protocols of compute express link, a portion of the fast, volatile memory of the solid-state drive can be optionally configured to provide cache-coherent memory services to the host system. Such memory services can be accessible via load/store instructions executed in the host system at a byte level (e.g., 64B or 128B) over the connection of computer express link. Another portion of the volatile memory of the solid-state drive can be reserved for internal use by the solid-state drive as a buffer memory to facilitate storage services to the host system. Such storage services can be accessible via read/write commands provided by the host system at a logical block level (e.g., 4 KB) over the connection of computer express link.

It is advantageous for a host system to use a communication protocol to query the solid-state drive about the memory attachment capabilities of the solid-state drive, such as whether the solid-state drive can provide cache-coherent memory services, what is the amount of memory that the solid-state drive can attach to the host system in providing memory services, how much of the memory attachable to provide the memory services can be considered non-volatile (e.g., implemented via non-volatile memory, or backed with a backup power source), what is the access time of the memory that can be allocated by the solid-state drive to the memory services, etc.

The query result can be used to configure the allocation of memory in the solid-state drive to provide cache-coherent memory services. For example, a portion of fast memory of the solid-state drive can be provided to the host system for cache coherent memory accesses; and the remaining portion of the fast memory can be reserved by the solid-state drive for internal. The partitioning of the fast memory of the solid-state drive for different services can be configured to balance the benefit of memory services offered by the solid-state drive to the host system and the performance of storage services implemented by the solid-state drive for the host system. Optionally, the host system can explicitly request the solid-state drive to carve out a requested portion of its fast, volatile memory as memory accessible over a connection, by the host system using a cache coherent memory access protocol according to computer express link.

For example, when the solid-state drive is connected to the host system to provide storage services over a connection of computer express link, the host system can send a command to the solid-state drive to query the memory attachment capabilities of the solid-state drive.

For example, the command to query memory attachment capabilities can be configured with a command identifier that is different from a read command; and in response, the solid-state drive is configured to provide a response indicating whether the solid-state drive is capable of operating as a memory device to provide memory services accessible via load instructions and store instructions. Further, the response can be configured to identify an amount of available memory that can be allocated and attached as the memory device accessible over the computer express link connection. Optionally, the response can be further configured to include an identification of an amount of available memory that can be considered non-volatile by the host system and be used by the host system as the memory device. The non-volatile portion of the memory device attached by the solid-state drive can be implemented via non-volatile memory, or volatile memory supported by a backup power source and the non-volatile storage capacity of the solid-state drive.

Optionally, the solid-state drive can be configured with more volatile memory than an amount backed by its backup power source. Upon disruption in the power supply to the solid-state drive, the backup power source is sufficient to store data from a portion of the volatile memory of the solid-state drive to its storage capacity, but insufficient to preserve the entire data in the volatile memory to its storage capacity. Thus, the response to the memory attachment capability query can include an indication of the ratio of volatile to non-volatile portions of the memory that can be allocated by the solid-state drive to the memory services. Optionally, the response can further include an identification of access time of the memory that can be allocated by the solid-state drive to cache-coherent memory services. For example, when the host system requests data via a cache coherent protocol over the compute express link from the solid-state drive, the solid-state drive can provide the data in a time period that is not longer than the access time.

Optionally, a pre-configured response to such a query can be stored at a predetermined location in the storage device attached by the solid-state drive to the host system. For example, the predetermined location can be at a predetermined logical block address in a predetermined namespace. For example, the pre-configured response can be configured as part of the firmware of the solid-state drive. The host system can use a read command to retrieve the response from the predetermined location.

Optionally, when the solid-state drive has the capability of functioning as a memory device, the solid-state drive can automatically allocate a predetermined amount of its fast, volatile memory as a memory device attached over the computer express link connection to the host system. The predetermined amount can be a minimum or default amount as configured in a manufacturing facility of solid-state drives, or an amount as specified by configuration data stored in the solid-state drive. Subsequently, the memory attachment capability query can be optionally implemented in the command set of the protocol for cache-coherent memory access (instead of the command set of the protocol for storage access); and the host system can use the query to retrieve parameters specifying the memory attachment capabilities of the solid-state drive. For example, the solid-state drive can place the parameters into the memory device at predetermined memory addresses; and the host can retrieve the parameters by executing load commands with the corresponding memory addresses.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 107), one or more non-volatile memory devices (e.g., memory device 109), or a combination of such.

In FIG. 1, the memory sub-system 110 is configured as a product of manufacture (e.g., a solid-state drive), usable as a component installed in a computing device.

The memory sub-system 110 further includes a host interface 113 for a physical connection 103 with a host system 120.

The host system 120 can have an interconnect 121 connecting a cache 123, a memory 129, a memory controller 125, a processing device 127, and a memory manager 101 configured to determine the memory attachment capability of the memory sub-system 110 and to configure memory services provided by the memory sub-system 110 over the connection 103.

The memory manager 101 in the host system 120 can be implemented at least in part via instructions executed by the processing device 127, or via logic circuit, or both. The memory manager 101 in the host system 120 can communicate over the connection 103 to query the memory attachment capability of the memory sub-system 110. Optionally, the memory manager 101 in the host system 120 is implemented as part of the operating system 135 of the host system 120, or a device driver configured to operate the memory sub-system 110, or both.

The connection 103 can be in accordance with the standard of compute express link (CXL), or other communication protocols that support cache-coherent memory access and storage access. Optionally, multiple physical connections 103 are configured to support cache-coherent memory access communications and support storage access communications.

The processing device 127 can be a microprocessor configured as a central processing unit (CPU) of a computing device. Instructions (e.g., load instructions, store instructions) executed in the processing device 127 can access memory 129 via the memory controller (125) and the cache 123. Further, when the memory sub-system 110 attaches a memory device over the connection 103 to the host system, instructions (e.g., load instructions, store instructions) executed in the processing device 127 can access the memory device via the memory controller (125) and the cache 123, in a way similar to the accessing of the memory 129.

For example, in response to execution of a load instruction in the processing device 127, the memory controller 125 can convert a logical memory address specified by the instruction to a physical memory address to request the cache 123 for memory access to retrieve data. For example, the physical memory address can be in the memory 129 of the host system 120, or in the memory device attached by the memory sub-system 110 over the connection 103 to the host system 120. If the data at the physical memory address is not already in the cache 123, the cache 123 can load the data from the corresponding physical address as the cached content 131. The cache 123 can provide the cached content 131 to service the request for memory access at the physical memory address.

For example, in response to execution of a store instruction in the processing device 127, the memory controller 125 can convert a logical memory address specified by the instruction to a physical memory address to request the cache 123 for memory access to store data. The cache 123 can hold the data of the store instruction as the cached content 131 and indicate that the corresponding data at the physical memory address is out of date. When the cache 123 needs to vacate a cache block (e.g., to load new data from different memory addresses, or to hold data of store instructions of different memory addresses), the cache 123 can flush the cached content 131 from the cache block to the corresponding physical memory addresses (e.g., in the memory 129 of the host system, or in the memory device attached by the memory sub-system 110 over the connection 103 to the host system 120).

The connection 103 between the host system 120 and the memory sub-system 110 can support a cache coherent memory access protocol. Cache coherence ensures that: changes to a copy of the data corresponding to a memory address are propagated to other copies of the data corresponding to the memory address; and load/store accesses to a same memory address are seen by processing devices (e.g., 127) in a same order.

The operating system 135 can include routines of instructions programmed to process storage access requests from applications.

In some implementations, the host system 120 configures a portion of its memory (e.g., 129) to function as queues 133 for storage access messages. Such storage access messages can include read commands, write commands, erase commands, etc. A storage access command (e.g., read or write) can specify a logical block address for a data block in a storage device (e.g., attached by the memory sub-system 110 to the host system 120 over the connection 103). The storage device can retrieve the messages from the queues 133, execute the commands, and provide results in the queues 133 for further processing by the host system 120 (e.g., using routines in the operating system 135).

Typically, a data block addressed by a storage access command (e.g., read or write) has a size that is much bigger than a data unit accessible via a memory access instruction (e.g., load or store). Thus, storage access commands can be convenient for batch processing a large amount of data (e.g., data in a file managed by a file system) at the same time and in the same manner, with the help of the routines in the operating system 135. The memory access instructions can be efficient for accessing small pieces of data randomly without the overhead of routines in the operating system 135.

The memory sub-system 110 has an interconnect 111 connecting the host interface 113, a controller 115, and memory resources, such as memory devices 107, . . . , 109.

The controller 115 of the memory sub-system 110 can control the operations of the memory sub-system 110. For example, the operations of the memory sub-system 110 can be responsive to the storage access messages in the queues 133, or responsive to memory access requests from the cache 123.

In some implementations, each of the memory devices (e.g., 107, . . . , 109) includes one or more integrated circuit devices, each enclosed in a separate integrated circuit package. In other implementations, each of the memory devices (e.g., 107, . . . , 109) is configured on an integrated circuit die; and the memory devices (e.g., 107, . . . , 109) can be configured in a same integrated circuit device enclosed within a same integrated circuit package. In further implementations, the memory sub-system 110 is implemented as an integrated circuit device having an integrated circuit package enclosing the memory devices 107, . . . , 109, the controller 115, and the host interface 113.

For example, a memory device 107 of the memory sub-system 110 can have volatile random access memory 138 that is faster than the non-volatile memory 139 of a memory device 109 of the memory sub-system 110. Thus, the non-volatile memory 139 can be used to provide the storage capacity of the memory sub-system 110 to retain data. At least a portion of the storage capacity can be used to provide storage services to the host system 120. Optionally, a portion of the volatile random access memory 138 can be used to provide cache-coherent memory services to the host system 120. The remaining portion of the volatile random access memory 138 can be used to provide buffer services to the controller 115 in processing the storage access messages in the queues 133 and in performing other operations (e.g., wear leveling, garbage collection, error detection and correction, encryption).

When the volatile random address memory 138 is used to buffer data received from the host system 120 before saving into the non-volatile memory 139, the data in the volatile random address memory 138 can be lost when the power to the memory device 107 is interrupted. To prevent data loss, the memory sub-system 110 can have a backup power source 105 that can be sufficient to operate the memory sub-system 110 for a period of time to allow the controller 115 to commit the buffered data from the volatile random access memory 138 into the non-volatile memory 139 in the event of disruption of an external power supply to the memory sub-system 110.

Optionally, the fast memory 138 can be implemented via non-volatile memory (e.g., cross-point memory); and the backup power source 105 can be eliminated. Alternatively, a combination of fast non-volatile memory and fast volatile memory can be configured in the memory sub-system 110 for memory services and buffer services.

In response to a memory attachment capability query from the host system 120, the memory manager 101 in the memory sub-system 110 can provide a response identifying: whether the memory sub-system 110 can provide cache-coherent memory services over the connection 103, what is the amount of memory that is attachable to provide the memory services over the connection 103, how much of the memory available for the memory services to the host system 120 is considered non-volatile (e.g., implemented via non-volatile memory, or backed with a backup power source 105), what is the access time of the memory that can be allocated to the memory services to the host system 120, etc.

The memory manager 101 in the memory sub-system 110 can be implemented at least in part via instructions (e.g., firmware) executed by the processing device 117 of the controller 115 of the memory sub-system 110, or via logic circuit, or both.

When a portion of the memory 138 is configured to provide memory services over the connection 103, the host system 120 can access a cached portion 132 of the memory 138 via load instructions and store instructions and the cache 123. The non-volatile memory 139 can be accessed via read commands and write commands transmitted via the queues 133 configured in the memory 129 of the host system 120.

Figure 2:
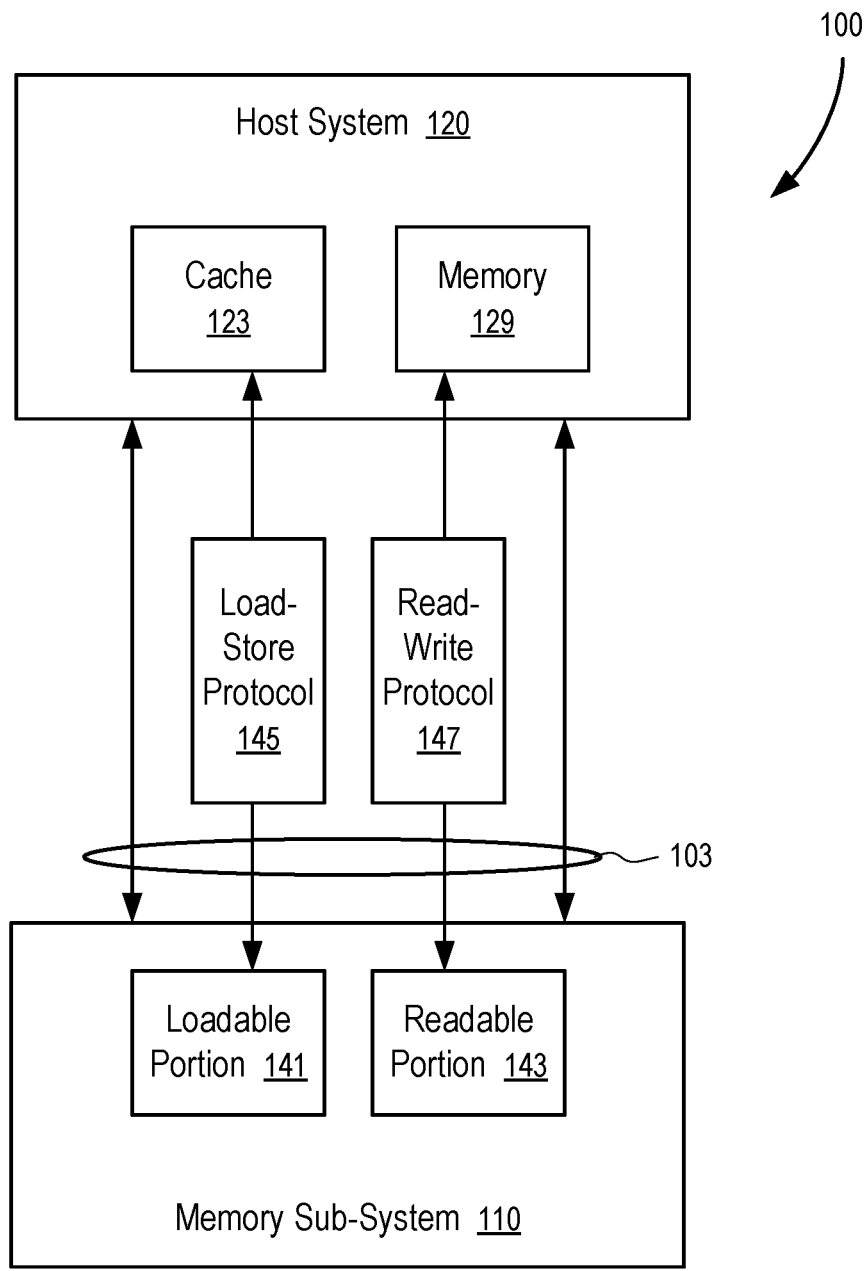
FIG. 2 shows a memory sub-system configured to offer both memory services and storage services to a host system over a physical connection according to one embodiment.

FIG. 2 shows a memory sub-system configured to offer both memory services and storage services to a host system over a physical connection according to one embodiment. For example, the memory sub-system 110 and the host system 120 of FIG. 2 can be implemented in a way as the computing system 100 of FIG. 1.

Figure 5:
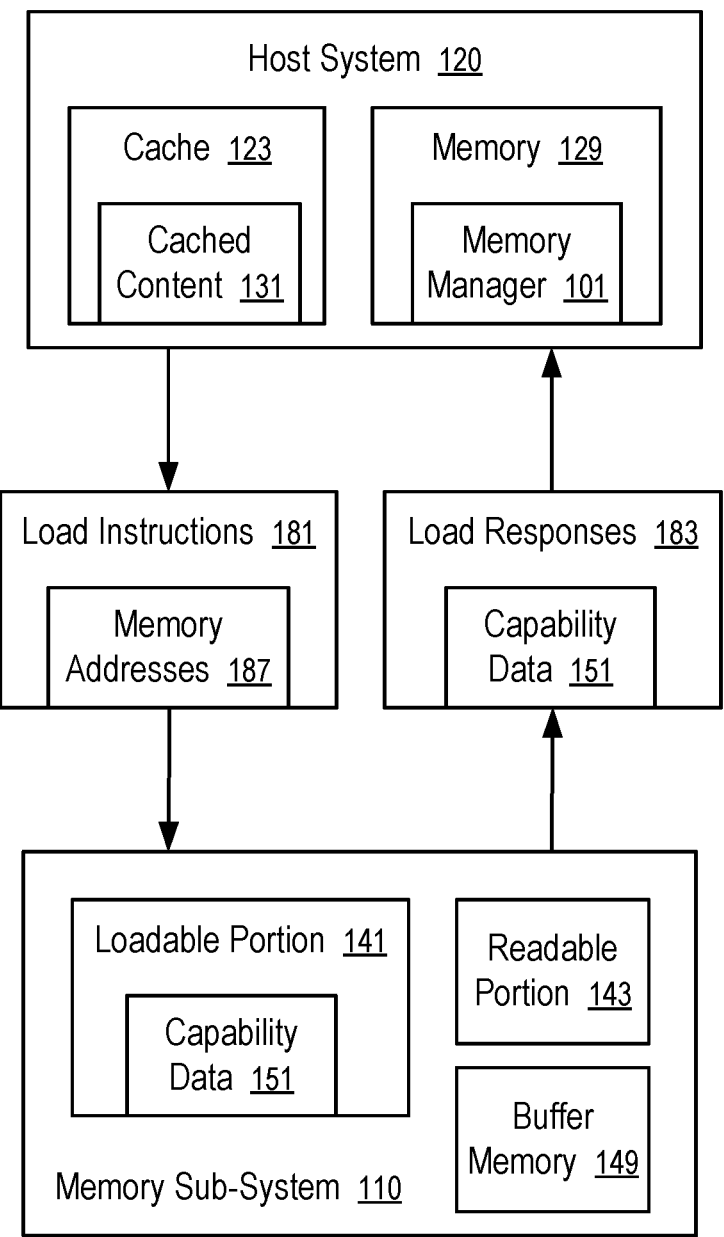
FIG. 5 illustrates the use of load instructions to communicate memory capability data from a memory sub-system to a host system according to one embodiment.

In FIG. 2, the memory resources (e.g., memory devices 107, . . . , 109) of the memory sub-system 110 are partitioned into a loadable portion 141 and a readable portion 143 (and an optional portion for buffer memory 149 in some cases, as in FIG. 5). A physical connection 103 between the host system 120 and the memory sub-system 110 can support a protocol 145 for load instructions and store instructions to access memory services provided in the loadable portion 141. For example, the load instructions and store instructions can be executed via the cache 123. The connection 103 can further support a protocol 147 for read commands and write commands to access storage services provided in the readable portion 143. For example, the read commands and write commands can be provide via the queues 133 configured in the memory 129 of the host system 120. For example, a physical connection 103 supporting a computer express link can be used to connect the host system 120 and the memory sub-system 110.

FIG. 2 illustrates an example of a same physical connection 103 (e.g., computer express link connection) configured to facilitate both memory access communications according to a protocol 145, and storage access communications according to another protocol 147. In general, separate physical connections can be used to provide the host system 120 with memory access according to a protocol 145 for memory access, and storage access according to another protocol 147 for storage access.

Figure 3:
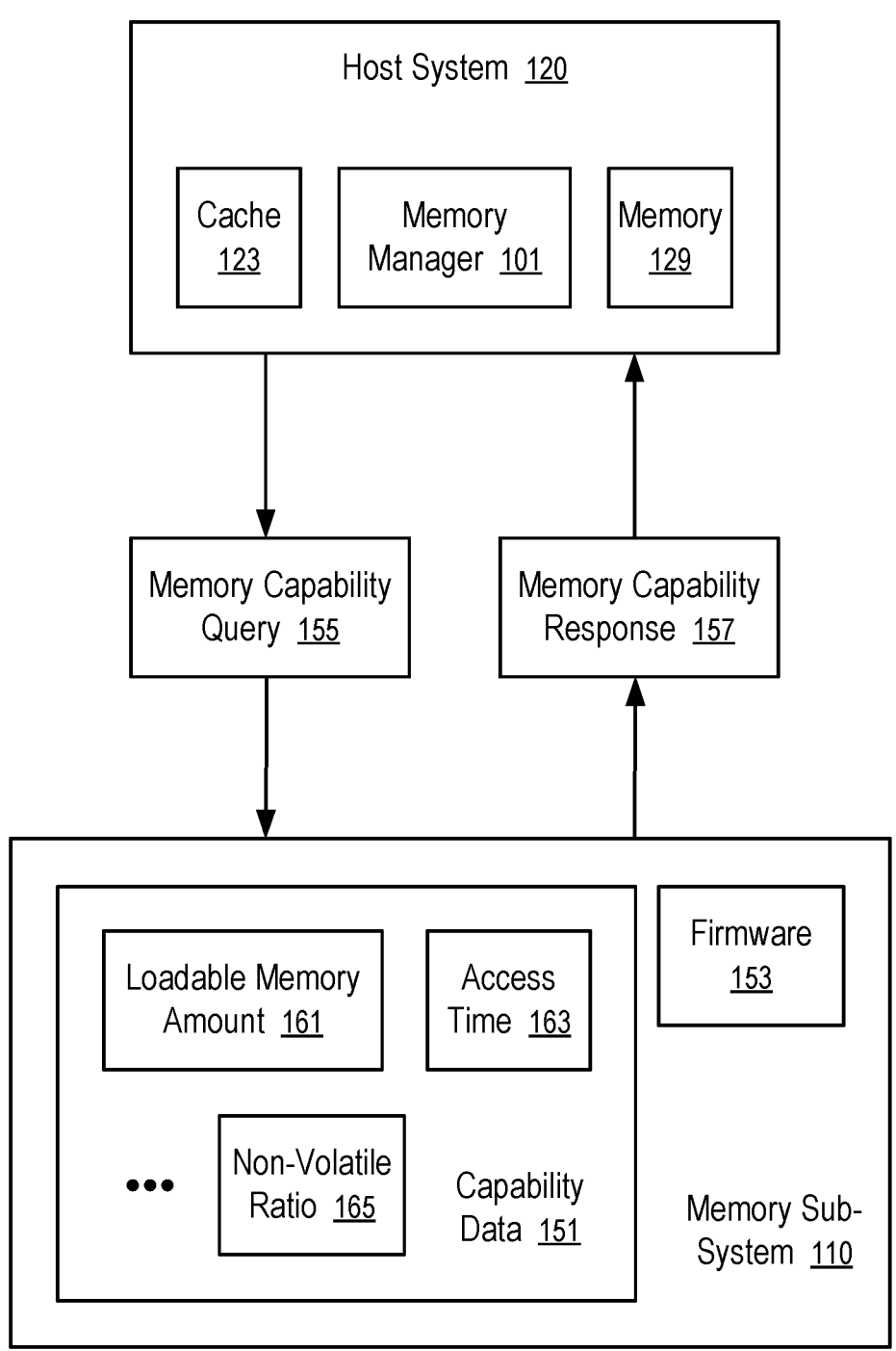
FIG. 3 shows the communication of memory capability data from a memory sub-system to a host system according to one embodiment.

FIG. 3 shows the communication of memory capability data from a memory sub-system to a host system according to one embodiment. For example, the communication of FIG. 3 can be implemented in the computing systems 100 of FIG. 1 and FIG. 2.

In FIG. 3, the memory manager 101 in the host system 120 sends a memory capability query 155 over a connection 103 between the host system 120 and the memory sub-system 110. In response, the memory sub-system 110 provides a response 157 containing the capability data 151 to identify capability parameters, such as the amount 161 of memory (e.g., 138) that can be allocated to the loadable portion 141, the access time 163 of the memory (e.g., 138) that can be allocated to the loadable portion 141, the ratio 165 of a non-volatile portion of the memory (e.g., 138, as backed by the backup power source 105) that can be allocated to the loadable portion 141, etc.

The query 155 can be configured in a protocol 147 for read commands and write commands (e.g., transmitted via queues 133 configured in the memory 129) to access the readable portion 143. Alternatively, or in combination, the query 155 can be configured in a protocol 145 for load instructions and store instructions to access the loadable portion 141 via the cache 123.

For example, when the memory sub-system 110 is connected to the host system 120 via the connection 103, the memory sub-system 110 can attach the readable portion 143 of its memory as a storage device to the host system 120. Thus, the host system 120 can send the query 155 in a way as configured in the protocol 147 designed for read commands and write commands to access the readable portion 143. The query 155 can be sent via a queue 133 configured in the memory 129 of the host system 120 and can have a command identifier that is different from a read command.

Optionally, the memory sub-system 110 can be configured to store the capability data 151 in a block at a predefined logical block address (e.g., in a predefined namespace). The capability data 151 can be stored as part of the firmware 153 of the memory sub-system 110; and the memory manager 101 in the host system 120 can use a read command configured with the logical block address to perform the query 155, as in FIG. 4.

For example, when the memory sub-system 110 is connected to the host system 120 via the connection 103, the memory sub-system 110 can attach the loadable portion 141 of its memory as a memory device to the host system 120. Thus, the host system 120 can send the query 155 in a way as configured in the protocol 145 designed for load instructions and store instructions to access the loadable portion 141. The query 155 can be sent via the memory controller 125 or a cache 123 of the host system 120 and can have a command identifier that is different from a load instruction.

Optionally, the memory sub-system 110 can be configured to store parameters of the capability data 151 in the loadable portion 141 at predefined memory addresses in the memory device attached by the memory sub-system 110 to the host system 120. The capability data 151 can be stored in the memory device as part of the power-up operations of firmware 153 of the memory sub-system 110; and the memory manager 101 of the host system 120 can use a number of load instructions with the memory addresses to perform the query 155 and load the parameters of the capability data 151 from the loadable portion 141, as in FIG. 5.

Figure 4:
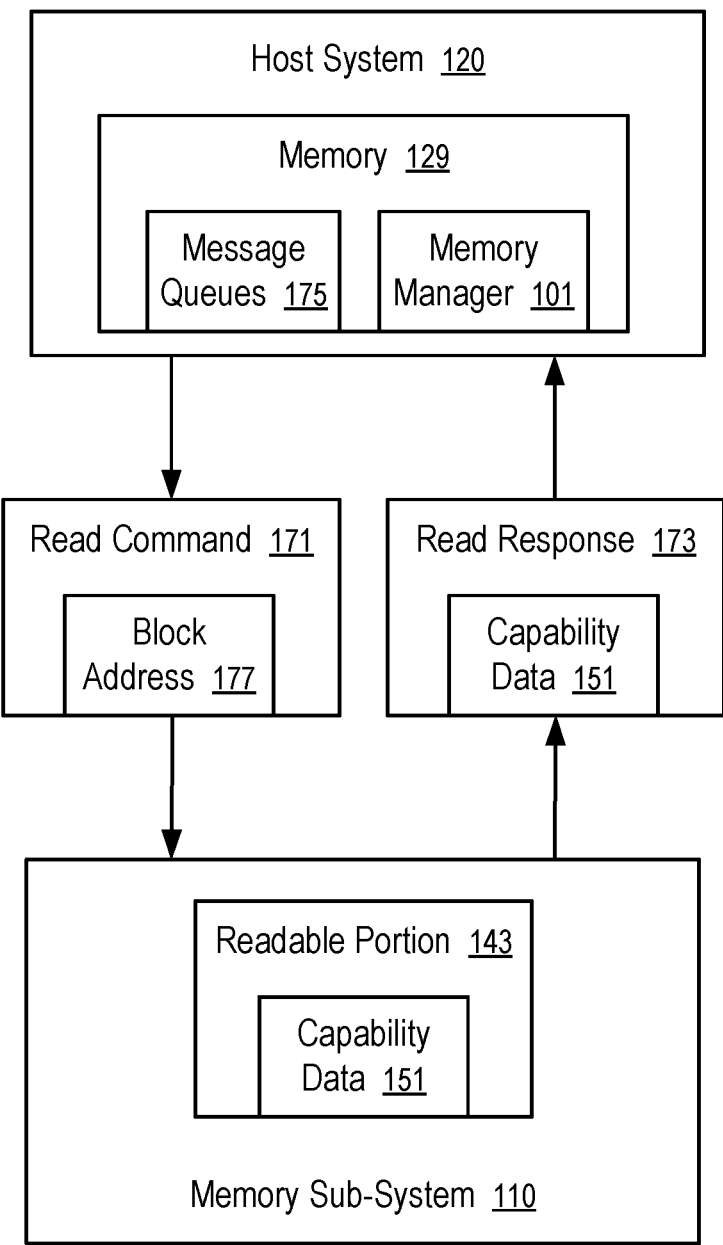
FIG. 4 illustrates the use of read commands to communicate memory capability data from a memory sub-system to a host system according to one embodiment.

FIG. 4 illustrates the use of read commands to communicate memory capability data from a memory sub-system to a host system according to one embodiment. For example, the query 155 and response 157 of FIG. 3 can be implemented via a read command 171 as in FIG. 4.

In FIG. 4, the memory sub-system 110 is configured to store capability data 151 at a predefined location represented by a logic block address 177 in the readable portion 143. For example, the capability data 151 can be configured as part of the firmware 153 of the memory sub-system 110, or stored at the block address 177 as part of the installation operation of the firmware 153.

After the readable portion 143 of the memory sub-system 110 is attached to the host system 120 over the physical connection 103, the memory manager 101 in the host system 120 can send a read command 171 containing the block address 177 (e.g., via the message queues 175).

The memory sub-system 110 can execute the read command 171 to retrieve the capability data 151 from the logical block address 177 in the readable portion 143, and provide the capability data 151 in a response 173 to the read command 171.

The data block represented by the block address 177 can have a size larger than the size of the capability data 151; and the read response 173 can include other data of interest to the memory manager 101 and/or the host system 120, such as the capabilities of the storage services of the memory sub-system 110, configuration data of the firmware 153 of the memory sub-system 110, etc.

FIG. 5 illustrates the use of load instructions to communicate memory capability data from a memory sub-system to a host system according to one embodiment. For example, the query 155 and response 157 of FIG. 3 can be implemented via load instructions 181 as in FIG. 5.

In FIG. 5, the memory sub-system 110 can partition its memory resources (e.g., memory devices 107, . . . , 109) into a loadable portion 141, a readable portion 143, and a buffer memory 149. The buffer memory 149 is configured to be used internally by the controller 115 of the memory sub-system 110 (and thus not addressable by the host system 120 using memory addresses). For example, the buffer memory 149 can be configured to provide memory services internally within the memory sub-system 110 to the processing device (s) 117 of the memory sub-system controller 115. Thus, memory addresses of load instructions and store instructions executed in the processing device 117 in the memory sub-system 110 can correspond to the physical addresses in the buffer memory 149, while memory addresses of load instructions and store instructions executed outside of the memory sub-system 110 (e.g., executed in the host system 120) do not correspond to the physical addresses in the buffer memory 149.

The loadable portion 141 can be addressed and accessed by the host system 120 via memory addresses used in the protocol 145 for memory access; and the readable portion 143 can be addressed and accessed by the host system 120 via logical block addresses used in the protocol 147 for storage access, as in FIG. 2.

The memory sub-system 110 can attach the loadable portion 141 as a memory device to the host system 120 (e.g., via a physical connection 103), and attach the readable portion 143 as a storage device to the host system 120 (e.g., via the physical connection 103).

The memory sub-system 110 can store the capability data 151 in the loadable portion 141 for access by the host system 120 using load instructions 181 having memory addresses 187 identifying the locations of the capability data 151 in the loadable portion 141.

For example, the parameters (e.g., amount 161, access time 163, . . . , non-volatile ratio 165) of the capability data 151 can be stored at different memory addresses 187. The memory manager 101 of the host system 120 can directly access the specific parameters using the respective memory addresses 187 of the parameters in the loadable portion 141. In response to the load instructions 181, the corresponding parameters (e.g., amount 161, access time 163, . . . , non-volatile ratio 165) can be provided in load responses 183.

Optionally, the memory addresses 187 of the capability data 151 can be configured in a cache block. Thus, when the memory manager 101 in the host system 120 uses an instruction to access one of the parameters, the cache block is loaded into the cache 123 as the cached content 131. The memory manager 101 in the host system 120 is free to access the parameters in the capability data 151 one at a time randomly or sequentially. The cache 123 can be configured to perform caching operations to optimize access performance for the host system 120 executing instructions in general (such as the instructions of the memory manager 101 in loading the parameters of the capability data 151).

In some implementations, the loadable portion 141 includes volatile random access memory 138. During a power-up operation, the memory sub-system 110 can initiate the execution of its firmware 153 and set up the capability data 151 in the loadable portion 141 (or in response to a request from the host system 120).

In some implementations, the loadable portion 141 includes non-volatile memory; and the capability data 151 can be configured in the loadable portion 141 during the installation of the firmware 153 of the memory sub-system 110.

FIG. 6 shows a method to identify memory capability of a data storage device available to provide memory services to a host system according to one embodiment. For example, the method of FIG. 6 can be implemented in computing systems 100 of FIG. 1 and FIG. 2 with the techniques of FIG. 3, FIG. 4, and FIG. 5 for a host system 120 to determine the memory attachment capabilities of a memory sub-system 110 that can be attached at least as a data storage device over a connection 103.

For example, a memory sub-system 110 (e.g., a solid-state drive) and a host system can be connected via at least one physical connection 103. The memory sub-system 110 can optically carve out a portion (e.g., loadable portion 141) of its fast memory (e.g., 138) as a memory device attached to the host system 120. The memory sub-system 110 can reserve a portion (e.g., buffer memory 149) of its fast memory (e.g., 138) as an internal memory for its processing device(s) (e.g., 117). The memory sub-system 110 can have a portion (e.g., readable portion 143) of its memory resources (e.g., non-volatile memory 139) as a storage device attached to the host system 120.

The memory sub-system 110 can have a backup power source 105 designed to guarantee that data stored in at least a portion of volatile random access memory 138 is saved in a non-volatile memory 139 when the power supply to the memory sub-system 110 is disrupted. Thus, such a portion of the volatile random access memory 138 can be considered non-volatile in the memory services to the host system 120.

At block 201, the memory sub-system 110 and the host system 120 communicate with each other over a connection 103 between the memory sub-system 110 and the host system 120.

For example, the memory sub-system 110 can have a host interface 113 that allows a same physical connection 103 (e.g., in accordance with computer express link (CXL)) to support both a cache coherent memory access protocol and a storage access protocol. Alternatively, separate physical connections can be provided between the host system 120 and the memory sub-system 110 for communications according to a cache coherent memory access protocol (e.g., 145) and for communications according to a storage access protocol (e.g., 147).

At block 203, the memory sub-system 110 allocates a first portion (e.g., readable portion 143) of its memory resources (e.g., memory devices 107, . . . , 109) to provide storage services to the host system 120 over the connection 103 according to a first protocol (e.g., 147).

For example, the first protocol (147) can be configured to allow the memory sub-system 110 to access storage access messages in queues 133 configured in a memory 129 of the host system. The storage access messages can include read commands, write commands, etc. The memory sub-system 110 can execute the commands in the queues 133 and provide responses in the queues 133.

At block 205, the memory sub-system 110 can receive, over the connection 103 from the host system 120, a query 155 about memory attachment capabilities of the memory sub-system 110, such as whether the memory sub-system 110 can provide memory services over the connection 103 according to a second protocol (e.g., 145) for cache coherent memory access.

For example, the second protocol (e.g., 145) can be configured to allow the cache 123 of the host system 120 to load data from memory addresses in response to load instructions executed in the processing device(s) (e.g., 127) of the host system 120, when the data at the memory addresses is not already in the cache 123 (e.g., in an event of cache miss). The second protocol can further allow the cache 123 to save modified, cached content 131 to the memory addresses. Communications according to the second protocol (e.g., 145) can ensure cache coherence such that: changes to a copy of the data corresponding to a memory address are propagated to other copies of the data corresponding to the memory address; and load/store accesses to a same memory address are seen by processing devices (e.g., 127) in a same order.

For example, the host system 120 can include a cache 123 to facilitate cache coherent memory access by the processing device(s) (e.g., 127) of the host system 120.

For example, the query 155 can be configured in the first protocol (e.g., 147) or in the second protocol (e.g., 145). A command identifier of the query 155 can be different from the command identifier of a read command or a load instruction. Alternatively, or in combination, the query 155 can be implemented via a read command 171 addressing a predetermined logical block address 177, or load instructions 181 addressing predetermined memory addresses 187.

At block 207, the memory sub-system 110 can identify data 151 representative of memory attachment capabilities of the memory sub-system 110 in providing memory services to the host system 120 according to the second protocol (e.g., 145).

For example, the capability data 151 can be configured to identify: an amount 161 of memory (e.g., 138) available in the memory sub-system 110 for allocation to the memory services; a ratio 165 between a volatile portion and a non-volatile portion of the amount 161 of memory available in the memory sub-system 110 for allocation to the memory services; an access time 163 of the amount of memory available in the memory sub-system 110 for allocation to the memory services; etc.

For example, the memory sub-system 110 can be configured to store the capability data 151, as part of firmware 153 of the memory sub-system 110, at a predetermined logical block address during installation of the firmware 153 of the memory sub-system, or in response to the query 155

For example, the memory sub-system 110 can be configured to store the capability data 151 at predetermined memory addresses during a power-up operation of firmware 153 executed in the memory sub-system 110, or in response to the query 155.

At block 209, the memory sub-system 110 can configure a response 157 to include the data 151 representative of memory attachment capabilities of the memory sub-system 110.

For example, the memory sub-system 110 can be configured to provide the response 157 via a read response 173 in response to a read command 171 containing the predetermined logical block address 177.

For example, the memory sub-system 110 can be configured to provide the response 157 via load responses 183 in response to load instructions 181 executed in the host system 120 to identify the predetermined memory addresses 187.

At block 211, the memory sub-system 110 provides, in response to the query 155, the response 157 containing the capability data 151.

For example, the host system 120 can determine, based on the capability data 151, a configuration of memory services and request the memory sub-system 110 (e.g., a solid-state drive) to provide the memory services according to the configuration over a computer express link connection 103.

It is advantageous for a host system 120 to customize aspects of the memory services of the memory sub-system 110 (e.g., a solid-state drive) for the patterns of memory and storage usages of the host system 120.

For example, a solid-state drive (SSD) can have the capability of functioning as a memory device over a compute express link (CXL) connection 103 for cache coherent memory access. The host system 120 can specify a size of the memory device offered by the solid-state drive for attachment to the host system 120, such that a set of physical memory addresses configured according to the size can be addressable via execution of load/storage instructions in the processing device(s) (e.g., 127) of the host system 120.

Optionally, the host system 120 can specify the requirements on time to access the memory device over the compute express link (CXL) connection 103. For example, when the cache 123 requests to access a memory location over the connection 103, the solid-state drive is required to provide a response within the access time specified by the host system 120 in configuring the memory services of the solid-state drive.

Optionally, the host system 120 can specify how much of the memory device attached by the solid-state drive is required to be non-volatile such that when an external power supply to the solid-state drive fails, the data in the non-volatile portion of the memory device attached by the solid-state drive to the host system 120 is not lost. The non-volatile portion can be implemented by the solid-state drive via non-volatile memory, or volatile memory (e.g., 138) with a backup power source 105 to continue operations of copying data from the volatile memory (e.g., 138) to non-volatile memory (e.g., 139) during the disruption of the external power supply to the solid-state drive.

Optionally, the host system 120 can specify whether the solid-state drive is to attach a memory device to the host system 120 over the compute express link (CXL) connection 103.

For example, the solid-state drive can have an area configured to store the configuration parameters of the memory device to be attached to the host system 120 via the compute express link (CXL) connection 103. When the solid-state drive reboots, starts up, or powers up, the solid-state drive can allocate, according to the configuration parameters stored in the area, a portion of its memory resources (e.g., memory devices 107, . . . , 109) as a memory device for attachment to the host system 120. After the solid-state drive configures the memory services according to the configuration parameters stored in the area, the host system 120 can access, via the cache 123, through execution of load instructions and store instructions identifying the corresponding physical memory addresses. The solid-state drive can configure its remaining memory resources (e.g., memory devices 107, . . . , 109) to provide storage services over the compute express link (CXL) connection 103. For example, a portion of its volatile random access memory 138 can be allocated as a buffer memory 149 reserved for the processing device(s) 117 of the solid-state drive; and the buffer memory 149 is inaccessible and non-addressable to the host system 120 via load/store instructions.

When the solid-state drive is connected to the host system 120 via a computer express link connection 103, the host system 120 can send commands to adjust the configuration parameters stored in the area for the attachable memory device. Subsequently, the host system 120 can request the solid-state drive to restart to attach, over the computer express link to the host system 120, a memory device with memory services configured according to the configuration parameters.

For example, the host system 120 can be configured to issue a write command (or store commands) to save the configuration parameters at a predetermined logical block address (or predetermined memory addresses) in the area to customize the setting of the memory device configured to provide memory services over the computer express link connection.

Alternatively, a command having a command identifier that is different from a write command (or a store instruction) can be configured in the read-write protocol 147 (or in the load-store protocol 145) to instruct the solid-state drive to adjust the configuration parameters stored in the area.

Figure 7:
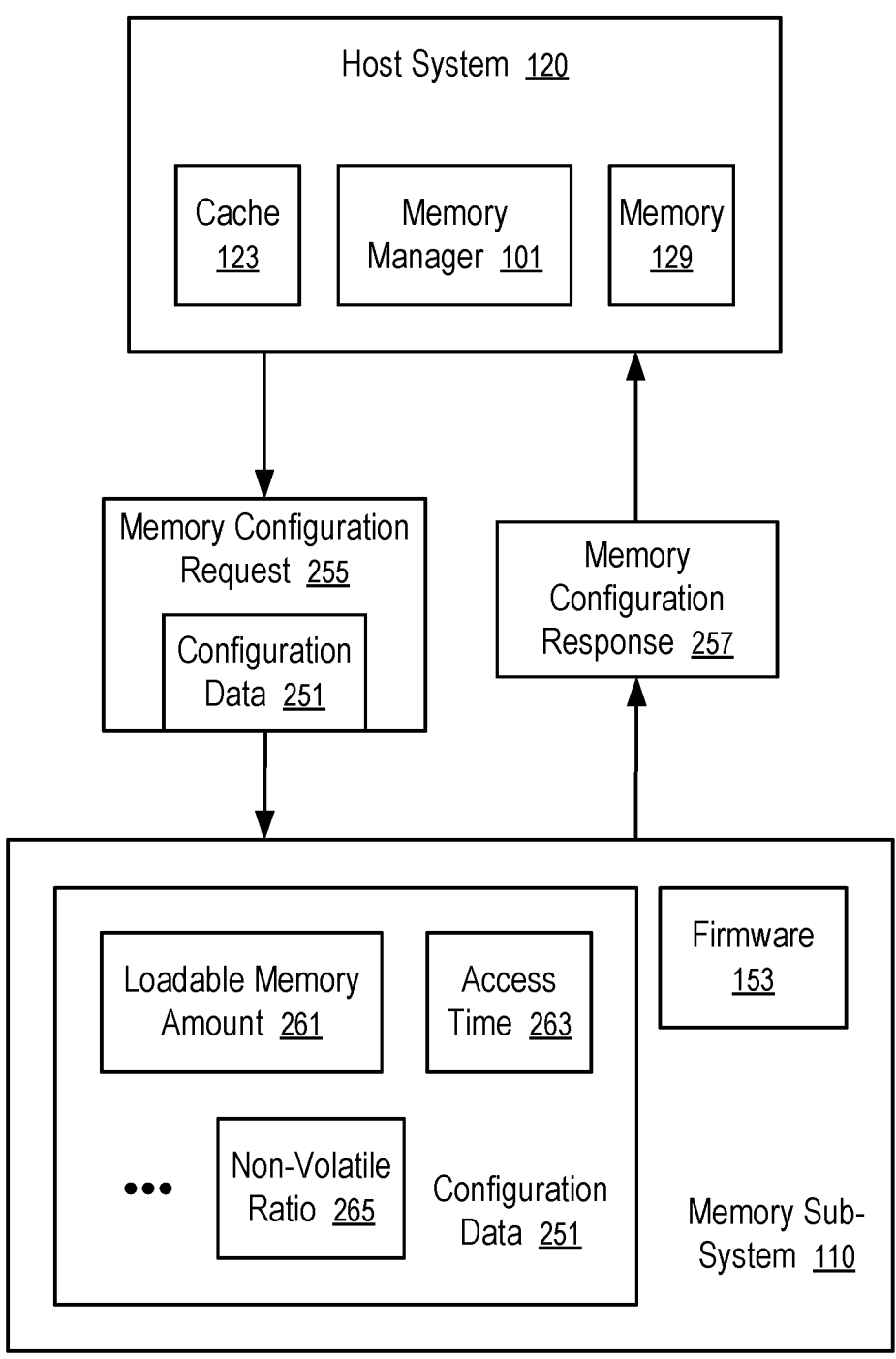
FIG. 7 shows a host system configuring memory services of a memory sub-system according to one embodiment.

FIG. 7 shows a host system configuring memory services of a memory sub-system according to one embodiment. For example, the configuration operation of FIG. 7 can be implemented in the computing systems 100 of FIG. 1 and FIG. 2.

For example, the memory manager 101 of the host system 120 and the memory manager 101 of the memory sub-system 110 can be further configured to communicate with each other to configure the memory services provided by the memory sub-system 110 over the connection 103 to the host system 120.

For example, after obtaining the memory attachment capability data 151 as in FIG. 3 to FIG. 6, the host system 120 can generate memory attachment configuration data 251 to customize aspects of the memory services provided by the memory sub-system 110 over the connection 103 between the memory sub-system 110 and the host system 120 using the protocol 145 for cache coherent memory access.

The host system 120 can send a memory configuration request 255 to identify the configuration data 251 to the memory sub-system 110. When the configuration data 251 are within permissible ranges (e.g., in view of the capability data 151), the memory sub-system 110 can accept the request 255 and store the configuration data 251 (e.g., as part of the configuration data of the firmware 153 of the memory sub-system 110).

For example, the configuration data 251 can identify an amount 261 of memory that the memory sub-system 110 is to allocate to the loadable portion 141 and attach, as a memory device, over the connection 103 to the host system 120.

For example, the configuration data 251 can identify an access time 263 of the loadable portion 141. When a request to load data from a memory address in the loadable portion 141 is received from the connection 103, the memory sub-system 110 is to provide the requested data within a time limit identified by the access time 263.

For example, the configuration data 251 can identify a ratio 265 between a non-volatile portion and a volatile portion of the amount 261 of memory allocated to provide the memory services over the connection 103. Data in the volatile portion can be discarded when an external power supply to the memory sub-system 110 is interrupted; and data in the non-volatile portion is guaranteed to be preserved during the external power supply interruption. For example, the non-volatile portion can be allocated from a non-volatile memory. Alternatively, the non-volatile portion can be implemented with a volatile memory with a backup power source 105 that guarantees the save storage of the data into a non-volatile memory during the power supply interruption.

Optionally, the configuration data 251 can specify separate access times 263 for the volatile portion and the non-volatile portion of the amount 261 allocated for the memory services.

Optionally, the configuration data 251 can specify whether or not the memory sub-system 110 is to provide memory services over the connection 103.

When the configuration data 251 requires that the memory sub-system 110 offers both a non-volatile portion and a volatile portion, the configuration data 251 can further specify the memory address range(s) for the non-volatile portion and the memory address range(s) for the volatile portion. Thus, the host system 120 can use the non-volatile portion for mission critical data (e.g., data to be preserved against power supply interruption), and use the volatile portion for data that can be regenerated, or that is disposable.

When the memory configuration request 255 identifies the configuration data 251 to request memory services that cannot be implemented by the memory sub-system 110 (e.g., for exceeding the capability of the memory sub-system 110 as indicated in the capability data 151), the memory sub-system 110 can reject the request 255 and maintain previously stored configuration data (or a default version of configuration data).

In response to the memory configuration request 255, the memory sub-system 110 can provide a memory configuration response 257 indicative of whether the request 255 is accepted.

Optionally, when the request 255 is not acceptable, the response 257 can include a copy of the capability data 151 (e.g., as in the memory capability response 157).

Optionally, when the request 255 is acceptable, the memory sub-system 110 can suspend further storage and memory transactions between the host system 120 and the memory sub-system 110, complete pending operations, and restart to provide the memory services according to the configuration data 251 identified by the memory configuration request 255.

In some implementations, the memory sub-system 110 can dynamically adjust some aspects of the memory services according to parameters specified in the configuration data 251 without restarting.

For example, when the host system 120 uses the request 255 to adjust the requirements of access time 263 in the configuration data 251, the memory sub-system 110 can adjust its operations to satisfy the requirements without having to restart.

For example, when the host system 120 uses the request 255 to increase or decrease the amount 261, the firmware 153 can dynamically re-allocate memory resources between the loadable portion 141 and the buffer memory 149 and adjust the memory services and storage services accordingly.

The memory configuration request 255 can be configured based on a protocol 147 for read commands and write commands to access the readable portion 143 (e.g., according to queues 133 configured in the memory 129), or a protocol 145 for load instructions and store instructions to access the loadable portion 141 via the cache 123.

For example, after the memory sub-system 110 is connected to the host system 120 via the connection 103, the memory sub-system 110 can attach the readable portion 143 of its memory as a storage device to the host system 120.

Thus, the host system 120 can send the memory configuration request 255 in a way as configured in the protocol 147 designed for read commands and write commands to access the readable portion 143. The request 255 can be sent via a queue 133 configured in the memory 129 of the host system 120 and can have a command identifier that is different from a write command.

Optionally, the memory sub-system 110 can be configured to write the configuration data 251 in a block at a predefined logical block address (e.g., in a predefined namespace). The configuration data 251 can be written as part of the configuration of the firmware 153 of the memory sub-system 110; and the memory manager 101 of the host system 120 can use a write command configured with the logical block address to perform the request 255, as in FIG. 8. In response to detecting the write command at the predefined logical block address (e.g., in the predefined namespace), the memory sub-system 110 can process the configuration data 251 of the write command as the request 255 and determine whether the request 255 is acceptable. If the memory services as requested by the configuration data 251 can be implemented by the memory sub-system 110, the memory sub-system 110 can execute the write command to store the configuration data 251 and then provide the response 257; otherwise, the memory sub-system 110 can reject the write command and provide a corresponding response 257.

For example, after the memory sub-system 110 is connected to the host system 120 via the connection 103, the memory sub-system 110 can attach the loadable portion 141 of its memory as a memory device to the host system 120 (e.g., according to a default configuration, or a previously stored configuration). Thus, the host system 120 can send the request 255 in a way as configured in the protocol 145 designed for load instructions and store instructions to access the loadable portion 141. The request 255 can be sent via the memory controller 125 or a cache 123 of the host system 120 and can have a command identifier that is different from a store instruction.

Optionally, the memory sub-system 110 can be configured to store the configuration data 251 in the loadable portion 141 at predefined memory addresses. The memory manager 101 of the host system 120 can use a number of store instructions with the memory addresses to update the parameters in the configuration data 251, as in FIG. 8. In response to detecting the store instruction at one of the predefined memory addresses, the memory sub-system 110 can process the updated parameter in the configuration data 251 as provided via the store instruction and determine whether the request 255 is acceptable. If the memory services as requested by the updated parameter of the configuration data 251 can be implemented by the memory sub-system 110, the memory sub-system 110 can allow the parameter to be updated and then provide the response 257; otherwise, the memory sub-system 110 can reject the request 255 represented by the store instruction and provide a corresponding response 257.

In some implementations, the updated configuration data 251 is effective after the host system 120 instructs the memory sub-system 110 to restart, or after the memory sub-system 110 is power cycled. Alternatively, the memory sub-system 110 can start operations to adjust memory services and storage services based on the configuration data 251 without restarting, after the update of the configuration data 251 is accepted.

Figure 8:
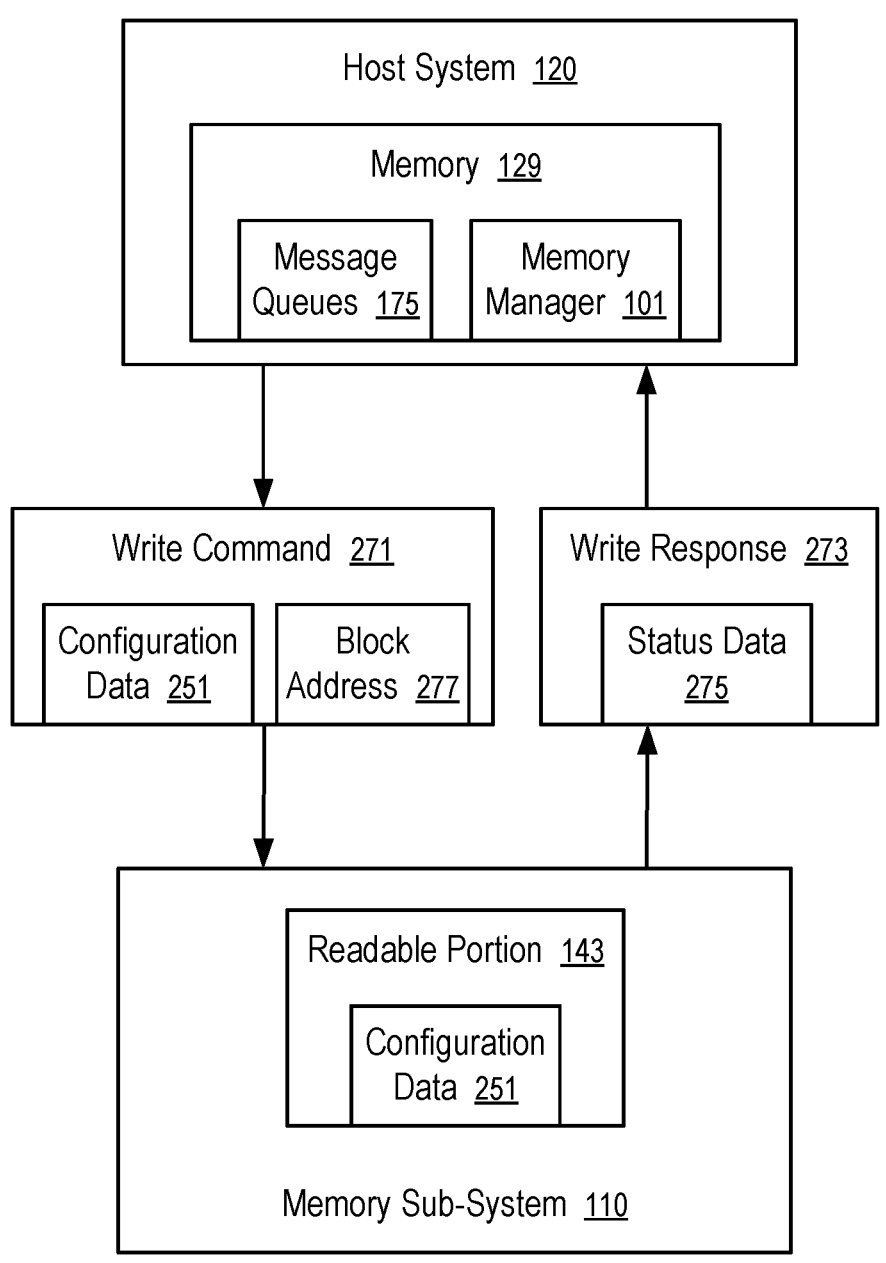
FIG. 8 illustrates the use of write commands to configure memory services of a memory sub-system according to one embodiment.

FIG. 8 illustrates the use of write commands to configure memory services of a memory sub-system according to one embodiment. For example, the memory configuration request 255 and response 257 of FIG. 7 can be implemented via a write command 271 as in FIG. 8.

In FIG. 8, the memory sub-system 110 is configured to provide memory services according to configuration data 251 stored at a predefined location represented by a logic block address 277 in the readable portion 143. For example, the configuration data 251 can be configured as part of the configuration options specified for the firmware 153 of the memory sub-system 110.

When the readable portion 143 of the memory sub-system 110 is attached to the host system 120 over the physical connection 103, the memory manager 101 in the host system 120 can send a write command 271 containing the block address 277 (e.g., via the message queues 175).

The memory sub-system 110 can detect that the write command 271 has a block address 277 for the configuration data 251. In response, the memory sub-system 110 can check if the parameters of the configuration data 251 provided via the write command 271 are valid. If the configuration data 251 is valid, the memory sub-system 110 can execute the write command 271 to store the configuration data 251 into the readable portion 143 to control the allocation of the loadable portion 141 and the memory services provided via the loadable portion 141.

A write response 273 for the write command 271 can include status data 275 indicating whether the write command 271 is executed.

The data block represented by the block address 277 can have a size larger than the size of the configuration data 251; and the write command 271 can be configured to write other data of interest to the memory sub-system 110.

Figure 9:
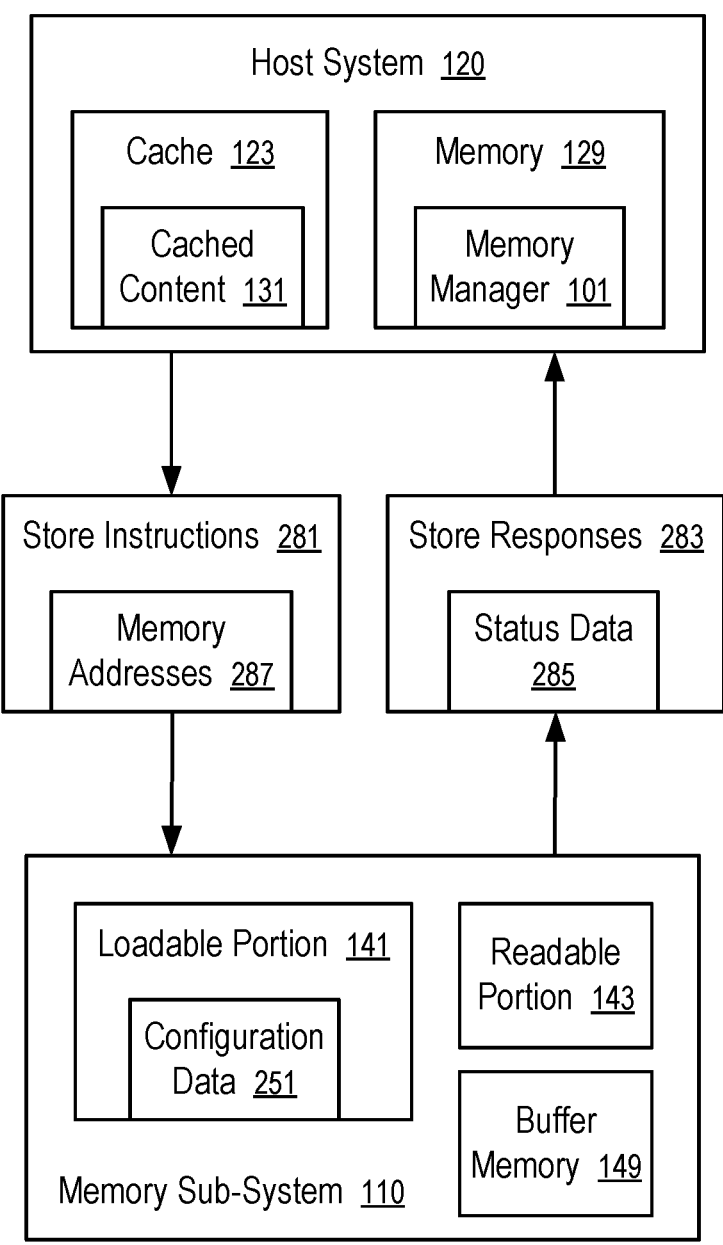
FIG. 9 illustrates the use of load instructions to configure memory services of a memory sub-system according to one embodiment.

FIG. 9 illustrates the use of load instructions to configure memory services of a memory sub-system according to one embodiment. For example, the memory configuration request 255 and response 257 of FIG. 7 can be implemented via store instructions 281 as in FIG. 9.

In FIG. 9, the memory sub-system 110 can partition its memory resources into a loadable portion 141, a readable portion 143, and a buffer memory 149, as in FIG. 5.

The memory sub-system 110 can attach the loadable portion 141 as a memory device to the host system 120 (e.g., via a physical connection 103), and attach the readable portion 143 as a storage device to the host system 120 (e.g., via the physical connection 103).

The memory sub-system 110 can use memory addresses 187 in the loadable portion 141 to receive updated parameters of the configuration data 251. When the host system 120 executes store instructions 281 having memory addresses 287 corresponding to the locations of parameters in the configuration data 251, the memory sub-system 110 can detect the change at the memory addresses 287 and check the validity of the parameters. When the parameters are valid, the memory sub-system 110 can accept the changes and configure the subsequent allocation of the loadable portion 141 according to the changes. However, if the parameters are invalid, the memory sub-system 110 can reject the changes of the store instructions 281.

For example, the parameters (e.g., amount 261, access time 263, . . . , non-volatile ratio 265) of the configuration data 251 can be configured to be received as the request 255 at different memory addresses 287. The memory manager 101 of the host system 120 can directly request the adjustment of the specific parameters using the respective memory addresses 287 of the parameters in the loadable portion 141 via store instructions 281.

Optionally, the memory sub-system 110 can provide store responses 283 having status data 285 indicative of whether the changes of the store instructions 281 are accepted.

Optionally, the memory addresses 287 of the capability data 151 can be configured in a cache block. Thus, the memory manager 101 in the host system 120 can use multiple store instructions to specify multiple parameters for the configuration data 251; and the cache 123 can store the parameters as the cached content 131 that is committed to the loadable portion 141 when the host system 120 is not using the cache block, or in response to a request for the memory manager 101 in the host system 120.

In some implementations, the loadable portion 141 includes volatile random access memory 138. The configuration data 251 at the memory addresses 287 in the loadable portion 141 can be configured in non-volatile portion of the volatile memory 138 allocated to the loadable portion 141. For example, the data in the non-volatile portion can be preserved via the memory sub-system 110 saving the data to a non-volatile memory (e.g., 139) using the backup power 105 in response to disruption in an external power supply to the memory sub-system 110.

Optionally, the firmware 153 of the memory sub-system 110 can be configured to save or copy a backup version of the configuration data 251 to the readable portion 143. During a power-up operation of the memory sub-system 110 can initialize configuration data 251 in the loadable portion 141 according to the backup copy in the readable portion 143 and use the configuration data 251 in the loadable portion 141 to control the memory services of the memory sub-system 110.

In some implementations, the memory storing the configuration data 251 in the loadable portion 141 is shared between the host system 120 and the processing device(s) (e.g., 117) of the memory sub-system 110.

FIG. 10 shows a method to configure memory services of a data storage device over a connection to a host system according to one embodiment. For example, the method of FIG. 10 can be implemented in computing systems 100 of FIG. 1 and FIG. 2 with the techniques of FIG. 7, FIG. 8, and FIG. 9 for a host system 120 to configure the memory services of a memory sub-system 110 provided over a connection 103. Optionally, the method of FIG. 10 can be used with the method of FIG. 6.

For example, a memory sub-system 110 (e.g., a solid-state drive) and a host system can be connected via at least one physical connection 103. The memory sub-system 110 can optically carve out a portion (e.g., loadable portion 141) of its fast memory (e.g., 138) as a memory device attached to the host system 120. The memory sub-system 110 can reserve a portion (e.g., buffer memory 149) of its fast memory (e.g., 138) as an internal memory for its processing device(s) (e.g., 117). The memory sub-system 110 can have a portion (e.g., readable portion 143) of its memory resources (e.g., non-volatile memory 139) as a storage device attached to the host system 120.

The memory sub-system 110 can have a backup power source 105 designed to guarantee that data stored in at least a portion of volatile random access memory 138 is saved in a non-volatile memory 139 when the external power supply to the memory sub-system 110 is disrupted. Thus, such a portion of the volatile random access memory 138 can be considered non-volatile in the memory services to the host system 120.

At block 301, the memory sub-system 110 communicates, with the host system 120 over a connection 103 between the memory sub-system 110 and the host system 120.

For example, the memory sub-system 110 can have a host interface 113 that allows a same physical connection 103 (e.g., in accordance with computer express link (CXL)) to support both a cache coherent memory access protocol and a storage access protocol. Alternatively, separate physical connections can be used provided between the host system 120 and the memory sub-system 110 for communications according to a cache coherent memory access protocol (e.g., 145) and for communications according to a storage access protocol (e.g., 147).

At block 303, the memory sub-system 110 allocates a first portion (e.g., readable portion 143) of memory resources (e.g., memory devices 107, . . . , 109) to provide storage services to the host system 120 over the connection 103 according to a first protocol (e.g., 147).

For example, the first protocol (e.g., 147) can be configured to allow the memory sub-system 110 to access storage access messages in queues 133 configured in a memory 129 of the host system. The storage access messages can include read commands, write commands, etc. The memory sub-system 110 can execute the commands in the queues 133 and provide responses in the queues 133.

At block 305, the memory sub-system 110 receives a request 255 to configure memory services of the memory sub-system 110.

For example, the request 255 can include configuration data 251 indicative of: an amount 261 of memory allocated by the memory sub-system 110 to the memory services; a ratio 265 between a volatile portion and a non-volatile portion of the amount 261 of memory allocated by the memory sub-system 110 to the memory services; an access time 263 of the amount 261 of memory allocated by the memory sub-system 110 to the memory services; etc.

At block 307, the memory sub-system 110 stores, according to the request 255, at least one configuration parameter of the memory services (e.g., the amount 261, the ratio 265, the access time 263).

At block 309, the memory sub-system 110 provides, in response to the request 255, a response 257 indicative of acceptance of the at least one configuration parameter (e.g., the amount 261, the ratio 265, the access time 263).

At block 311, the memory sub-system 110 allocates a second portion of the memory resources (e.g., memory devices 107, . . . , 109) to provide, according to the at least one configuration parameter (e.g., the amount 261, the ratio 265, the access time 263), the memory services to the host system 120 over the connection according to a second protocol (e.g., 145).

For example, the second protocol (e.g., 145) can be configured to allow the cache 123 of the host system 120 to load data from memory addresses in response to load instructions executed in the processing device(s) (e.g., 127) of the host system 120, when the data at the memory addresses is not already in the cache 123 (e.g., in an event of cache miss). The second protocol (e.g., 145) can further allow the cache 123 to save modified, cached content 131 to the memory addresses. Communications according to the second protocol can ensure cache coherence such that: changes to a copy of the data corresponding to a memory address are propagated to other copies of the data corresponding to the memory address; and load/store accesses to a same memory address are seen by processing devices (e.g., 127) in a same order.

For example, the host system 120 can include a cache 123 to facilitate cache coherent memory access by the processing device(s) (e.g., 127) of the host system 120.

For example, the request 255 can be configured in the first protocol (e.g., 147) or in the second protocol (e.g., 145). A command identifier of the request 255 can be different from the command identifier of a write command or a store instruction. Alternatively, or in combination, the request 255 can be implemented via a write command 271 addressing a predetermined logical block address 277, or store instructions 281 addressing predetermined memory addresses 287.

For example, the memory sub-system 110 can be configured to provide the response 257 via a write response 273 in response to a write command 271 containing the predetermined logical block address 277 pre-associated with the configuration data 251 in the memory sub-system 110. In response to detecting the write command 271 configured to modify the configuration data 251 in the memory sub-system 110, the memory sub-system 110 can determine whether the modified configuration data are within the ranges of the capability data 151 before allowing the execution of the write command 271 in the memory sub-system 110.

For example, the memory sub-system 110 can be configured to provide the response 257 via store responses 283 in response to store instructions 281 executed in the host system 120 to identify the predetermined memory addresses 287 pre-associated with the configuration parameters (e.g., the amount 261, the access time 263, the ratio 265) in the configuration data 251 in the memory sub-system 110. In response to detecting the store instructions 281 configured to modify the configuration parameters (e.g., the amount 261, the access time 263, the ratio 265) in the configuration data 251 in the memory sub-system 110, the memory sub-system 110 can determine whether the modified configuration parameters are within the ranges of the capability data 151 before allowing the changes of the store instructions 281 to take effect in the memory sub-system 110.

For example, the memory sub-system 110 can determine, in response to the request 255, whether to accept the at least one configuration parameter (e.g., the amount 261, the access time 263, the ratio 265) specified in the request 255. The determination can be based on capability data 151 representative of memory attachment capabilities of the memory sub-system 110 in providing, over the connection, the memory services to the host system 120 according to the second protocol (e.g., 145).

Optionally, the host system 120 can use the method of FIG. 6 to determine the capability data 151 and select the at least one configuration parameter (e.g., the amount 261, the access time 263, the ratio 265) according to the capability data 151.

Optionally, when the host system 120 specifies, in the request 255, a configuration parameter (e.g., the amount 261, the access time 263, the ratio 265) that exceeds the capability indicated by the capability data 151, the memory sub-system 110 can provide the capability data 151 in the response 257 (or treat the request 255 as a query 155 to provide a memory capability response 157 instead).

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 127) and a software stack executed by the processor chipset. The processor chipset can include one or more cores, one or more caches (e.g., 123), a memory controller (e.g., controller 125) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 113. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 109) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 127 of the host system 120 can be, for example, a microprocessor, a central processing unit (CPU), a processing core of a processor, an execution unit, etc. In some instances, the controller 125 can be referred to as a memory controller, a memory management unit, and/or an initiator. In one example, the controller 125 controls the communications over a bus coupled between the host system 120 and the memory sub-system 110. In general, the controller 125 can send commands or requests to the memory sub-system 110 for desired access to memory devices 109, 107. The controller 125 can further include interface circuitry to communicate with the memory sub-system 110.

The interface circuitry can convert responses received from the memory sub-system 110 into information for the host system 120.

The controller 125 of the host system 120 can communicate with the controller 115 of the memory sub-system 110 to perform operations such as reading data, writing data, or erasing data at the memory devices 109, 107 and other such operations. In some instances, the controller 125 is integrated within the same package of the processing device 127. In other instances, the controller 125 is separate from the package of the processing device 127. The controller 125 and/or the processing device 127 can include hardware such as one or more integrated circuits (ICs) and/or discrete components, a buffer memory, a cache memory, or a combination thereof. The controller 125 and/or the processing device 127 can be a microcontroller, special purpose logic circuitry (e.g., a field programmable gate array (FPGA), an application specific integrated circuit (ASIC), etc.), or another suitable processor.

The memory devices 109, 107 can include any combination of the different types of non-volatile memory components and/or volatile memory components. The volatile memory devices (e.g., memory device 107) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 109 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 109 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 109 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 109 can be based on any other type of non-volatile memory, such as read-only memory (ROM), phase change memory (PCM), self-selecting memory, other chalcogenide based memories, ferroelectric transistor random-access memory (FeTRAM), ferro-electric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EE-PROM).

A memory sub-system controller 115 (or controller 115 for simplicity) can communicate with the memory devices 109 to perform operations such as reading data, writing data, or erasing data at the memory devices 109 and other such operations (e.g., in response to commands scheduled on a command bus by controller 125). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 109. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 109. The controller 115 can further include host interface circuitry to communicate with the host system 120 via the physical host interface. The host interface circuitry can convert the commands received from the host system into command instructions to access the memory devices 109 as well as convert responses associated with the memory devices 109 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 109.

In some embodiments, the memory devices 109 include local media controllers 137 that operate in conjunction with the memory sub-system controller 115 to execute operations on one or more memory cells of the memory devices 109. An external controller (e.g., memory sub-system controller 115) can externally manage the memory device 109 (e.g., perform media management operations on the memory device 109). In some embodiments, a memory device 109 is a managed memory device, which is a raw memory device combined with a local controller (e.g., local media controller 137) for media management within the same memory device package. An example of a managed memory device is a managed NAND (MNAND) device.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations discussed above (e.g., to execute instructions to perform operations corresponding to operations described with reference to FIG. 1). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory sub-system 110 of FIG. 1.

In one embodiment, the instructions include instructions to implement functionality discussed above (e.g., the operations described with reference to FIG. 1). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

communicating, by a memory sub-system, with a host system over a connection between the memory sub-system and the host system;

allocating, by the memory sub-system, a first portion of memory resources to provide storage services to the host system over the connection according to a first protocol;

receiving, in the memory sub-system, a request to configure memory services of the memory sub-system;

storing, in the memory sub-system according to the request, at least one configuration parameter of the memory services;

providing, by the memory sub-system in response to the request, a response indicative of acceptance of the at least one configuration parameter;

allocating, by the memory sub-system to provide, according to the at least one configuration parameter, the memory services to the host system over the connection according to a second protocol; and determining, by the memory sub-system, to accept the at least one configuration parameter, based on data representative of memory attachment capabilities of the memory sub-system in providing over the connection, the memory services to the host system according to the second protocol.

2. The method of claim 1, wherein the connection is in accordance with computer express link (CXL).

3. The method of claim 2, wherein the second protocol is configured for cache coherent memory access to the memory services.

4. The method of claim 3, wherein the at least one configuration parameter is indicative of an amount of memory in the memory sub-system allocated to the memory services and addressable by the host system over the connection.

5. The method of claim 4, wherein the at least one configuration parameter is further indicative of a ratio between a volatile portion and a non-volatile portion of the amount of memory in the memory sub-system allocated to the memory services and addressable by the host system over the connection.

6. The method of claim 4, wherein the at least one configuration parameter is further indicative of an access time of the amount of memory in the memory sub-system allocated to the memory services and addressable by the host system over the connection.

7. The method of claim 4, wherein the request includes a write command containing a predetermined logical block address; and the method further comprises:

executing, by the memory sub-system in response to a determination to accept the at least one configuration parameter, the write command to store data representative of the at least one parameter at the predetermined logical block address.

8. The method of claim 7, further comprising:

detecting, by the memory sub-system, the write command based on the predetermined logical block address; and determining, by the memory sub-system in response to the write command being detected and to the executing of the write command, whether to accept the at least one configuration parameter to be written via execution of the write command prior;

wherein data stored at the predetermined logical block address is configured as part of configuration data of firmware of the memory sub-system.

9. The method of claim 4, wherein the request is responsive to a store instruction executed in the host system and addressed to a predetermined memory address; and wherein the configuration parameter is stored in the memory sub-system at the predetermined memory address.

10. The method of claim 9, wherein the request is in accordance with the second protocol configured for cache coherent memory access to the memory services.

11. A memory sub-system, comprising:

a host interface operable on a connection to a host system;

volatile memory, wherein the memory sub-system is operable to allocate a portion of the volatile memory to provide memory services to the host system over the connection;

non-volatile memory operable to provide storage services to the host system over the connection;

a backup power source; and a controller configured to:

receive, via the host interface, a request to adjust an aspect of the memory services provided by the memory sub-system to the host system over the connection;

determine that the request is permitted by data indicative of capabilities of the memory sub-system in provision of the memory services to the host system over the connection; and provide, via the host interface, a response to the request, the response;

wherein the aspect adjusted by the request includes:

a ratio between a volatile portion and a non-volatile portion of the amount of memory allocated by the memory sub-system to the memory services; and an access time of the amount of memory accessible to the host system over the connection.

12. The memory sub-system of claim 11, wherein the connection is in accordance with computer express link (CXL).

13. The memory sub-system of claim 11, wherein the memory sub-system is configured to store, at a predetermined logical block address, configuration data of firmware of the memory sub-system; and wherein the memory sub-system is configured to provide the response in response to a write command, containing the predetermined logical block address, from the host system to write configuration parameters of the memory service.

14. The memory sub-system of claim 10, wherein the memory sub-system is configured to store configuration parameters of the memory services at predetermined memory addresses; and wherein the memory sub-system is configured to provide the response in response to load instructions executed in the host system to identify the predetermined memory addresses and adjusted configuration parameters for the memory services.

15. A non-transitory computer storage medium storing instructions which, when executed in a computing system, cause the computing system to perform a method, comprising:

operating a cache in a host system of the computing system to access memory services provided in the computing system;

configuring a plurality of queues in a memory of the host system to access storage services provided by a solid-state drive connected to the host system over a computer express link connection;

allocating, by the solid-state drive, a first portion of memory resources to provide the storage services to the host system over the computer express link connection according to a first protocol of storage access through the queues;

allocating, by the solid-state drive, a second portion of the memory resources to provide the memory services over the computer express link connection according to a second protocol of cache coherent memory access;

transmitting, over the computer express link connection from the host system to the solid-state drive, a request to adjust an aspect of the memory services;

storing, by the solid-state drive, configuration data of the memory services according to the request; and providing, by the solid-state drive based on the configuration data, the memory services to the host system over the computer express link connection;

wherein the configuration data is indicative of an amount of memory allocated by the solid-state drive to the memory services.

16. The non-transitory computer storage medium of claim 15, wherein the configuration data is indicative of:

a ratio between a volatile portion and a non-volatile portion of the amount of memory allocated by the solid-state drive to the memory services; and an access time of the amount of memory allocated by the solid-state drive to the memory services.

17. The non-transitory computer storage medium of claim 16, wherein the method further comprises:

storing, by the solid-state drive, the configuration data at a predetermined logical block address to configure firmware of the solid-state drive, in response to a write command placed in the queues and containing the predetermined logical block address.

18. The non-transitory computer storage medium of claim 16, wherein the method further comprises:

storing, by the solid-state drive, a parameter of the configuration data at a predetermined memory address, in response to a store instruction executed in the host system and identifying the predetermined memory address.

* * * * *